(12) United States Patent
Schornack et al.

(10) Patent No.: US 6,785,517 B2
(45) Date of Patent: Aug. 31, 2004

(54) CONCURRENT WIRELESS/LANDLINE INTERFACE APPARATUS AND METHOD

(75) Inventors: Louis W. Schornack, Park Ridge, IL (US); Carl T. Heitschel, Naperville, IL (US); Nuri G. Anter, Westchester, IL (US); Neil Beneditz, St. Joseph, MI (US); Jay Kinder, McHenry, IL (US)

(73) Assignee: Telular Corp., Vernon Hills, IL (US)

( * ) Notice: Subject to any disclaimer, the term of this patent is extended or adjusted under 35 U.S.C. 154(b) by 0 days.

(21) Appl. No.: 09/727,738

(22) Filed: Feb. 20, 2001

(65) Prior Publication Data

US 2001/0041533 A1 Nov. 15, 2001

Related U.S. Application Data

(63) Continuation of application No. 09/325,087, filed on Jun. 3, 1999, which is a continuation of application No. 08/309,845, filed on Sep. 20, 1994, now Pat. No. 5,946,616.

(51) Int. Cl.[7] ................................................. H04B 1/38
(52) U.S. Cl. .................. 455/74.1; 455/426.1; 455/554.1
(58) Field of Search .................................. 455/426, 428, 455/422, 552, 561, 3.05, 426.1, 403, 553.1, 74.1, 554.1, 552.1, 424; 379/58, 59, 61, 63, 93

(56) References Cited

U.S. PATENT DOCUMENTS

| | | | | |
|---|---|---|---|---|
| 4,953,198 A | * | 8/1990 | Daly et al. | 455/465 |
| 4,959,851 A | * | 9/1990 | Tobolski et al. | 455/74.1 |
| 4,989,230 A | * | 1/1991 | Gillig et al. | 455/552.1 |
| 5,127,041 A | * | 6/1992 | O'Sullivan | 379/93.05 |
| 5,127,042 A | * | 6/1992 | Gillig et al. | 455/552.1 |
| 5,146,486 A | * | 9/1992 | Lebowitz | 379/39 |
| 5,751,789 A | * | 5/1998 | Farris et al. | 379/2 |
| 5,911,120 A | * | 6/1999 | Jarett et al. | 370/335 |

* cited by examiner

*Primary Examiner*—Cong Van Tran
(74) *Attorney, Agent, or Firm*—Much Shelist Freed

(57) ABSTRACT

An apparatus for interfacing at least one landline telephone service, at least one wireless cellular-type telephone service, at least one cellular-type wireless telephone and at least one standard telephonic type communication device through standard building interior telephone cable.

14 Claims, 12 Drawing Sheets

CONCURRENT WIRELESS/LANDLINE INTERFACE APPARATUS AND METHOD

CROSS REFERENCE TO RELATED APPLICATIONS

The present application is a continuation of application Ser. No. 09/325,087, filed on Jun. 3, 1999, which is a continuation of application Ser. No. 08/309,845, filed on Sep. 20, 1994, and now U.S. Pat. No. 5,946,616.

BACKGROUND AND PRIOR ART

The present invention relates to a system which integrates a standard telephonic type communication device, a cellular-type wireless service, a cellular interface system such as described in U.S. Pat. No. 4,658,096, issued Apr. 14, 1987 to West et al., existing telephone wiring installed within a building, and a telephone company wireline service. In particular, the standard telephonic type communication device, when connected to the invention, is capable of selectively both receiving and initiating calls over the cellular type wireless service as well as also both receiving and initiating calls over the telephone company wireline service.

Known cellular interface products such as the Telular Phonecell™, PCS$^{one}$™, of Telular Corporation, Buffalo Grove, Ill., and competing products from other companies, had difficulty in being connected to one or more telephone extensions located in other areas of a building remote from the interface. The Telular PCS$^{one}$™ System shown pictorially in FIG. 1, is a combination charging circuit and docking station for hand-held cellular transceivers such as the Motorola MICRO-TAC™ transceiver which allows the coupling of a standard telephone type communication device, such as a facsimile, modem, plain old telephone (POT) or any other device that would normally be coupled to a standard telephone wall jack. Connection of more than one telephone extension at separate locations within the building disadvantageously required that separate wiring be installed in the building or required a trained installer to rewire the existing installed telephone wiring of a building, often with unsatisfactory results. After this installation or rewiring effort, two single line standard telephones were necessary to access both the telephone company and cellular-type service (cellular). A two line telephone would be required if a single instrument would be used to access both the telephone company (telco) wireline service as well as the cellular interface line. When an incoming or outgoing call would occur, there was often confusion as to whether the telco service or the cellular service was being accessed.

In addition, with the known cellular interface a consumer often made a mistake in the installation of this type of product by not reading the manual and incorrectly plugging the cellular interface directly into the telco service line. This was in violation of Federal Communications Commission (FCC) Part 68 rules and invited possible damage to the cellular interface and to the telco equipment. Known cellular interfaces were difficult to be installed by individuals possessing no technical knowledge of electricity or of the telephone system. Each building is different as to whether it has telco line 1 wiring installed, telco line 2 wiring installed, wiring shorts between wires on telco line 1 or line 2, an active Telco line 1, or an active Telco line 2. Because of all these variables, there was difficulty for the consumer to effectively and consistently be able to properly install a known cellular interface in a dwelling without a large number of consumer problems, and perhaps significant numbers of damaged cellular interface devices. Prior art interfaces lacked adaptive intelligence and system diagnostics to sense the unique environment into which it was installed and properly react to it Although prior art cellular interfaces allowed a standard telephonic type communication device to be connected to cellular service, prior art interfaces disadvantageously did not allow a standard telephonic type communication device to be selectively switched between wireline and cellular service. Prior art interfaces had no provision for connection to a wireline telephone company service.

This invention is directed at solving these and other disadvantages of the prior art.

OBJECTS OF THE INVENTION

An object of the invention is to allow a facility, normally wired for a single telephone line from the wireline telephone company, to become a two-line facility, with the second line coupled to a wireless communication system and remain fully compatible with all FCC Part 68 devices, including standard telephones, (both, single and double line), facsimile devices, alarm systems and modems.

Another object of the invention is to allow a consumer without any tools or knowledge of a telephone system to use the invention by easily allowing him to use his standard house telephone wiring and add a cellular communication capability as an additional line to his current system without improperly coupling an active device to a landline telephone outlet.

SUMMARY OF THE INVENTION

Accordingly, in accordance with an illustrative embodiment of the present invention, there is provided a telephonic communication system having at least one communication device for interconnection with a telephone network via at least two communication media, the improvement comprising means for coupling the at least one communication device with the at least two communication media, and means for individually determining the availability of each of the at least two communication media, and means responsive to the determining means connected to the coupling means for automatically interconnecting the at least one communication device with the telephone network via the available one of the communication media.

In accordance with another illustrative embodiment of the present invention, there is provided a communication system having first and second communication paths and at least one telephonic type communication device, the system being coupled to at least two communication networks for providing a first and second means of communication, said first means of communication coupled to the first communication path, and the communication system having at least one means for coupling the at least one telephonic communication type device to said first communication path, the improvement being means between said at least one telephonic type communication device and said coupling means for connecting said telephonic type communication device to said second communication path, and switching means coupled to said second communication path and to said first and second means of communication for selectively coupling said second communication path to one of said first and second means of communication.

In accordance with yet another illustrative embodiment of the present invention, there is provided a communication system having a communication path and at least one telephonic type communication device, the communication system being coupled to a communication network for providing a means of communication, and the communication system having at least one telephonic communication type device coupled to said communication path, the improvement being testing means coupled to said communication path for testing the presence of any signal thereon, and interface means coupled to said communication path and said testing means and being responsive to said testing means for coupling said communication path to said communication network.

In accordance with still another illustrative embodiment of the present invention, there is provided a communication system comprising a cellular type interface coupled between a cellular-type transceiver and a six position wall jack coupling means with at least four positions having individual conductors coupled thereto, a telephonic type device coupled to at least two of said individual conductors, and means coupled between said telephonic type device and said six position telephone jack coupling means for inverting the position of at least two of said individual conductors to the position of two of the other individual conductors.

DETAILED DESCRIPTION OF PREFERRED EMBODIMENT

Figure 1:
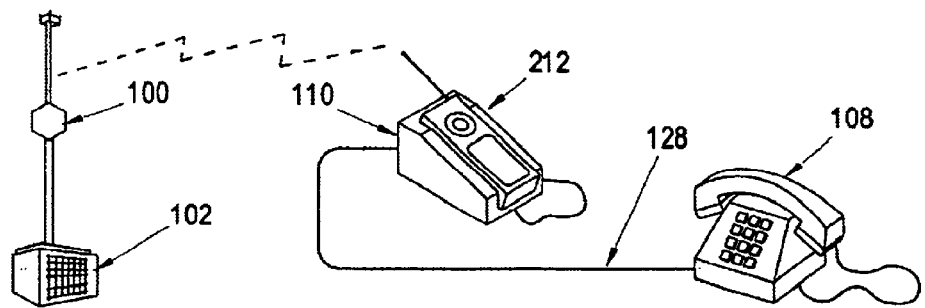
FIG. 1 is a pictorial diagram of a prior art cellular interface connected to a standard telephonic type communication device.
Figure 2:
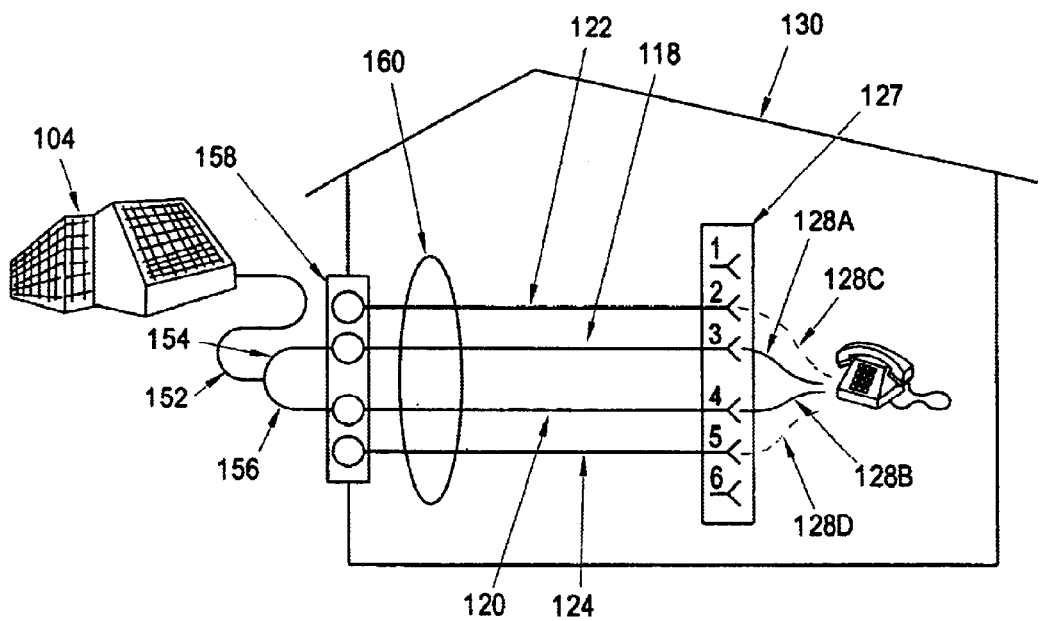
FIG. 2 is a simplified pictorial prior art diagram of a wireline telephone company central office, a customer's building having four conductor wireline telephone company cabling installed therein, and a single line telephonic type communication device connected to two of the four conductors.

Referring now to FIG. 2, a building 130 has been wired with a four conductor cable 160 for distributing a wireline telephone company service to a location within the building. The location has a six position telephone jack terminating the wireline telephone company service. FIG. 2 shows only one six position telephone jack 127 at only one location for simplicity; however, the building 130 has a plurality of locations, each position has a six position telephone jack 127 such as an RJ-11 jack for wireline telephone service termination. The service from the wireline telephone company central office 104 is via a two conductor cable 152 having a tip 154 and a ring 156 conductor. The tip 154 and ring 156 conductors from the central office 104 are connected to a service entrance terminal block 158. The four conductor cable 160 of the building 130 is connected to the terminal block 158. Two conductors 118 and 120 (usually with red and green wire insulation) of the four conductors of the building cable are connected to the tip 154 and ring 156 conductors from the central office 104. The other two conductors 122 and 124 (usually with black and yellow wire insulation), although connected to the service entrance terminal block 158, are not used for communication with the central office 104 if the building has only single telephone line service, such as a typical single family residential dwelling. In addition to being connected to the service entrance terminal block 158, the yellow 124 and black 122 wires are also connected to a "line 2" position of the 6 position telephone jack 127 at each termination of wireline telephone service within the building 130. Therefore, the black 122 and yellow 124 conductors (ie line 2) of the building telephone cable 160 are available for interconnection between the invention and a plurality of standard telephonic type communication devices, each device normally capable of being coupled to a telco line (hereinafter "telephonic device"). The invention is simultaneously connected to both wireline and cellular services. The invention is housed in a docking station similar to the PCS$^{one}$™ presently being manufactured by Telular Corporation.

Figure 3:
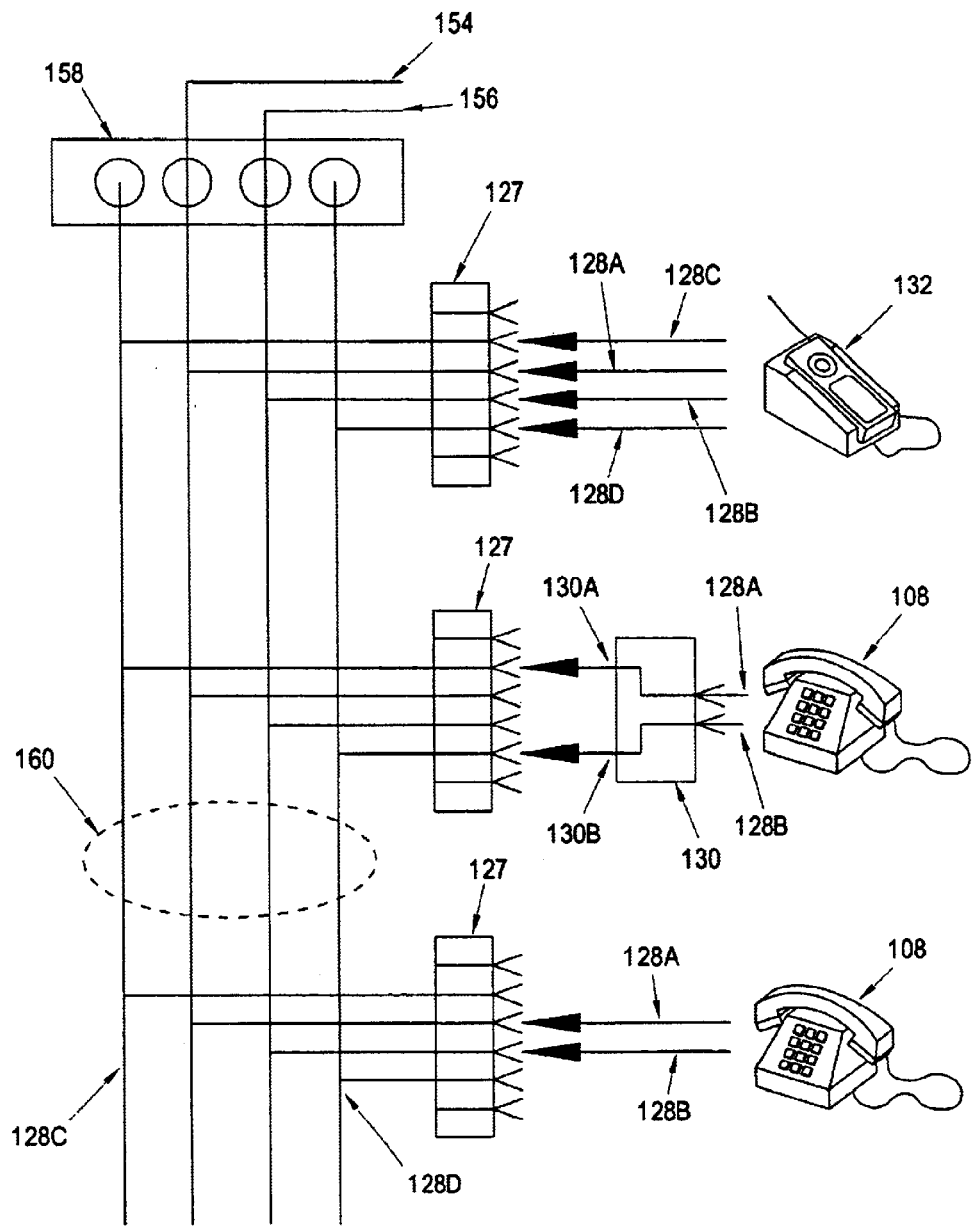
FIG. 3 is a simplified diagram showing the connection of the invention and of two standard telephonic type communication devices.

Referring now to FIG. 3, the installation of the invention starts by directly plugging the invention 132 into an available, typically wall mounted, six position telephone jack 127 via leads 128A–128D. The power supply is connected to the system, and the power plug of the power supply is plugged into an available power outlet. All pre-installed single line telephone devices are unplugged from the wall telephone jacks, a line inversion adapter 130 with leads 130A. 130B is inserted into the telephone jack 127, and each single telco line telephone device 108 is plugged into the line inversion adapter 130 or conversely, one or more telephone devices can also be left as pre-installed, via leads 128A, 128B, as shown in FIG. 3. Single line standard telephonic type communication devices are designed to be plugged into the "line 1" position of six position telephone jacks. The line inversion adapter causes the device to be connected to "line 2" of the telephone jack. A telephone device 108 which is dedicated to the telco line does not use the inversion adapter 130 at the wall telephone jack 127.

Upon being installed, the invention will perform a set of system diagnostics to determine if there are any problems with the installation environment. Determination of the electrical environment includes but is not limited to: sensing if the unit telephone receptacle is connected to the external wiring; sensing if the external wiring has a functioning connection to a central office on Line 1; sensing if the external wiring has a functioning connection to a central office on Line 2; and sensing whether standard telephone devices are connected to Line 2. System installation problems' are displayed as codes on a display of a portable cellular telephone placed in the docking station of the housing. Interpretation of these error codes is in a user's manual.

Upon performing an installation successfully, calls can be received and placed on both the telco service and cellular service. Placing an outgoing call is accomplished normally by picking up the telephone receiver and dialing. The invention has different sets of criteria which can be used to determine whether it will default to the telco service or to cellular service. The criteria will vary depending on how the unit is marketed and the service/customer which the unit is expected to serve. For example, an internal electronic clock/calendar allows the defaulting to depend upon the time of day and day of week in order to take advantage of differing telephone rates.

When a receiver of a telephone device is taken off hook with the invention set to default to the telco service, and the user wants to place a call on the cellular service, the user enters the cellular code, preferably C The invention then switches the telephone from the telco line to the cellular line. An outgoing call is then placed normally. If the unit defaults to the cellular service and the user wishes to place a call on the telco service, the user enters the telco code, preferably T. The call is then placed normally.

An incoming call on the telco line rings normally and is answered by just picking up the receiver. An incoming call on the cellular line has a slightly different ring characteristic (preferably it is two bursts during the two second ring period followed by a four second off time). Because the telephone rings with these two different characteristics, the person answering the call can tell in advance which line is ringing. If a call is received on the telco line and is answered and shortly thereafter a call is received on the cellular line, a call waiting beep is heard in the telephone receiver. If the person using the telephone performs a hook flash on the switchhook of the telephone instrument, the telco line is placed on hold by the invention and the cellular line is connected to the telephone instrument. If a hook flash is again performed on the switch-hook of the telephone, the telco line is reconnected and the cellular line is placed on hold. The same sequence of events applies if the initial call is received on the cellular line instead of the telco line. If a call is in progress on the cellular line and a telco line call is being received (as evidenced by the telco line ringing,) a beep is heard through the telephone receiver. A hook flash puts the cellular line on hold and connects the telco line. The portion of the operation of the invention not fully disclosed herein is described in the aforesaid U.S. Patent to West et al., which is hereby incorporated by reference.

TABLE 1

| Event Name | General Description. |
| --- | --- |
| Off Hook | Receiver of POTS device has been taken off the hook. |
| Hang Up | Receiver of POTS device has been placed on the hook. |
| DialTone | Dial tone has been detected on the telco line. |
| No Dial Tone | No dial tone has been detected on the telco line. |
| Telco Ring | Detected the POTS device ringing from incoming telco call. |
| No Telco Ring | POTS device stopped ringing from incoming telco call. |
| Cel Alert | Incoming call from the cellular radio. |
| Digit Entry | Digits entered from the POTS device. |
| Dial Complete | Outgoing caller has completed dialing. |
| Cel Code | Sequence of digits (**C) to switch from telco line to cel line. |
| Telco Code | Sequence of digits (**T) to switch from cel line to telco line. |
| Lost Telco | The telco line has lost its connection. |
| Hook Flash | Momentary pressing (hang up) of POTS device receiver hook. |
| Cel Not Inuse | The called party on the cellular line has hung up. |

The Off Hook event as described in Table 1 is detected by monitoring loop current on either the telco line or the cellular line depending on which is switched in. (The cel line is normally switched in.) This is done by software stored in Read Only Memory (ROM) internal to a microprocessor detecting an active low signal on the Telco LC (U3 port P3.0, FIG. 6A) when on a telco line, or Cel LC (U3 port P3.5) when on a cellular line. The software does not recognize an off hook event unless loop current had been absent (on hook) for more than 700 msec and then loop current became present for at least 500 msec. The software switches the invention from the cellular line to the telco line through hardware (U3 port P.1, FIG. 6A), where cellular line is active high, and telco line is active low.

The Hang Up event as described in Table 1 is detected by monitoring loop current on either the telco line or the cellular line depending on which is switched in. This is done by software detecting an active low signal on the Telco LC (U3 port P3.0, FIG. 6A) when on telco line, or Cel LC (U3 port P3.5) when on cellular line. Software does not recognize a Hang Up event unless loop current had been present (off hook) for more than 500 msec and then an absence of loop current occurred for at least 700 msec.

Figure 6A:
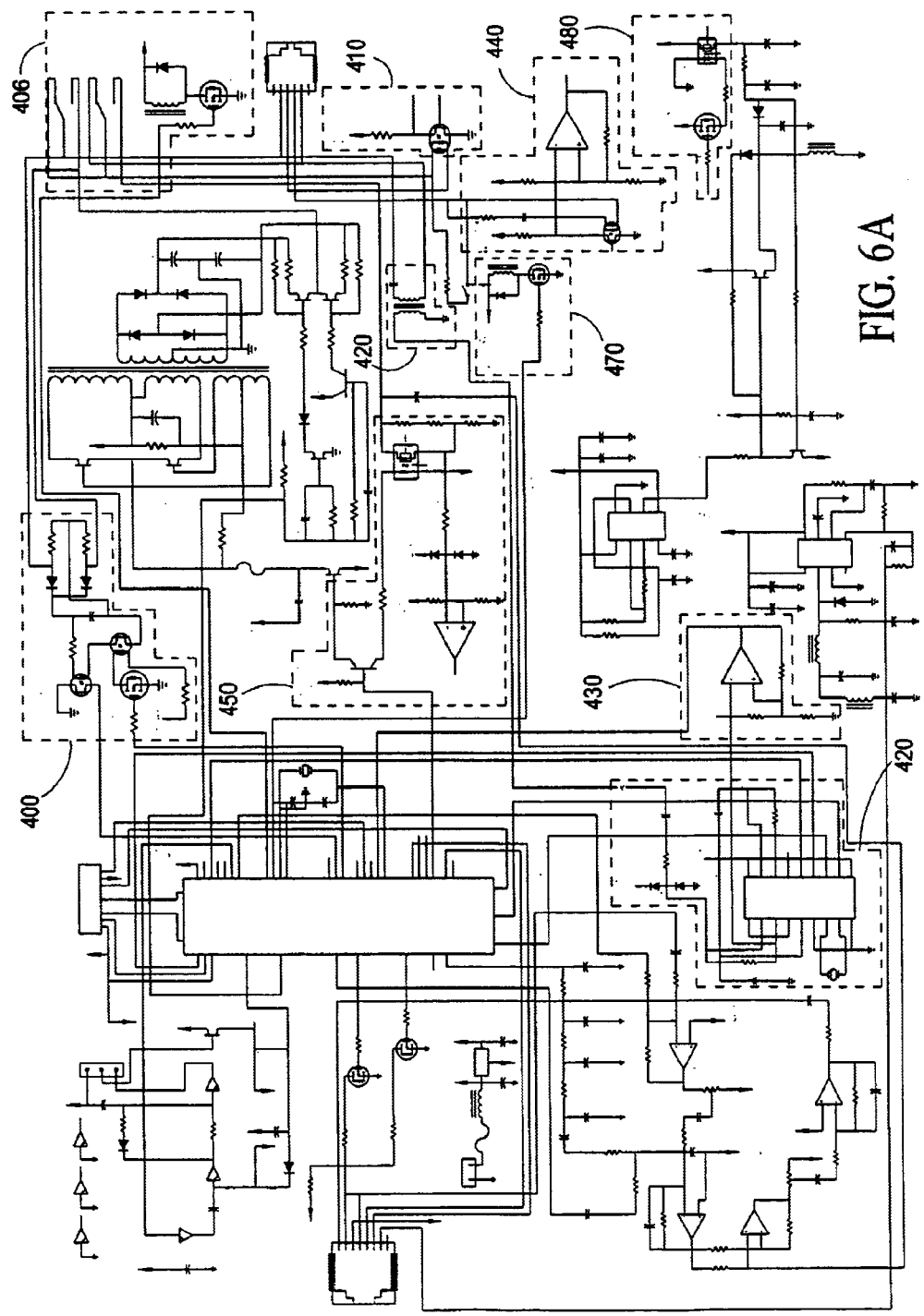
FIG. 6A is a detailed schematic diagram of the invention.

The Dial Tone event as described in Table 1 is detected by software monitoring the hardware dial tone input at U3, port P3.7, FIG. 6A. Software must look for a sequence of transitions on this port that represent a pattern created by a superimposed 350 Hz with 440 Hz signal produced by zero crossing detection. Software does not recognize the Dial Tone Event unless this signal is present for at least 500 msec while the Off hook condition is true and connected to the telco line (active low asserted on U3, port P2.1, FIG. 6A.).

The No Dial Tone event as described in Table 1 is detected by software monitoring the hardware dial tone input at U3 port P3.7, FIG. 6A. Software must look for a sequence of transitions on this port that represent a pattern created by a super imposed 350 Hz with 440 Hz signal. Software does not recognize the No Dial Tone Event unless there is an absence of this signal for at least one second while the Off hook condition is true and connected to the telco line.

The Telco Ring event as described in Table 1 is detected by software monitoring the hardware signal input at U3 port P3.4, FIG. 6A. Software recognizes the Telco Ring Event by transitions on this port produced by a the ring signal (between 15 and 65 Hz) for at least 100 msec.

The No Telco Ring event as described in Table 1 is detected by software monitoring the hardware signal input at U3 port P3.4, FIG. 6A. Software does not recognize the No Telco Ring event, unless the Telco Ring event has first been detected. When the Telco Ring event is detected, the No Telco Ring event may be detected by the absence of the ring signal at U3 port P3.4 for at least 5 seconds.

The Cel Alert event as described in Table 1 is detected by software receiving a cell alert message from the cellular telephone via serial transmission.

The Cel Alert, the Digit Entry event, and the Dial Complete event are well known in the prior art.

The Cel Code event as described in Table 1 is detected by software recognizing a sequence "**C" dialed.

The Telco Code event as described in Table 1 is detected by software recognizing a sequence "**T" dialed.

The Lost Telco event as described in Table 1 is detected by the software of the invention. The software recognizes a telco connection by asserting an active high on the hardware telco hold line through U3, port P2.0, FIG. 6A and checking that telco loop current is present (active low on input U3, port P3.0). If telco loop current is not present after software asserts an active hold, then software detects the Lost Telco condition.

The Hook Flash event as described in Table 1 is detected by monitoring loop current on either the telco line or the cellular line depending on which is switched in. This is done by software detecting an active low signal on the Telco LC (U3 port P3.0, FIG. 6A) when on the telco line, or Cel LC (U3 port P3.5) when on cellular line. Software does not recognizes the Hook Flash event unless loop current had been present (off hook) for more than 500 msec and then an absence of loop current occurred for at least 200 msec, but no more than 700 msec.

The Cel Not Inuse event as described in Table 1 is detected by software receiving the message from the cellular radio via serial transmission and is well know in prior art.

Figure 4:
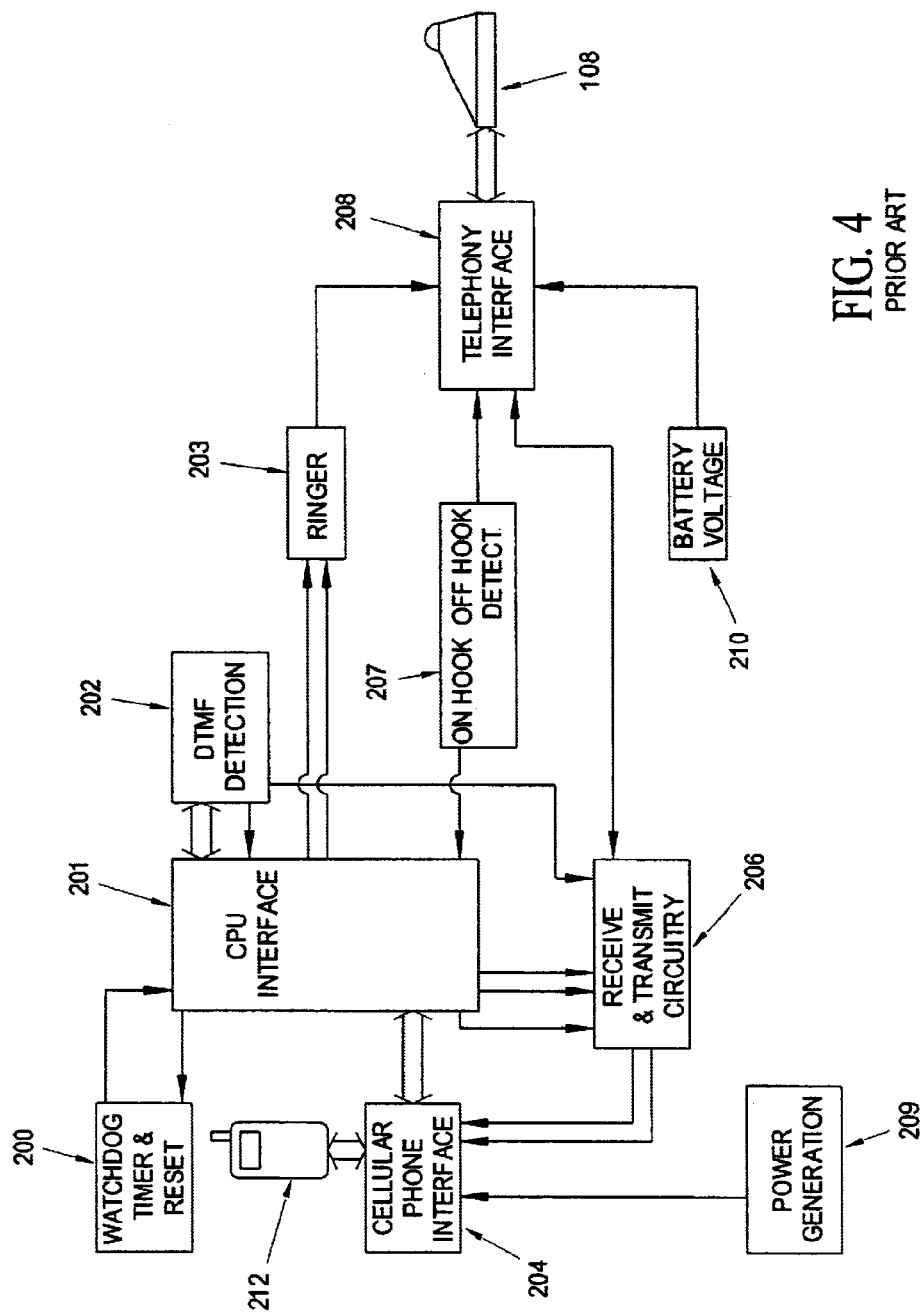
FIG. 4 is a block diagram of a prior art cellular interface.

The prior-art system shown in FIG. 4 interfaces a cellular telephone 212 to a telephonic device 108 and it allows the telephonic device 108 to access communications via the cellular transceiver 212. The system connects to a cellular transceiver 212 via a cellular telephone interface 204. The cellular telephone interface 204 is the actual physical connection which interfaces the cellular transceiver 212 to the invention, and also connects to a telephonic device 108 via 208 the telco line interface. All the necessary information and power to the cellular telephone is received and/or supplied through the cellular telephone interface 204.

Once power is applied to the invention, communication is established between the cellular transceiver 212 and the CPU interface 201. It uses a microprocessor, preferably an Intel 8051 type, to perform all its operations such as initializing the cellular transceiver 212, setting all of the control signals (I/O s) to their initial states for a ringer circuit 203, and a receive and transmit circuit 206. The software is written in 8051 assembly language. All functions of the unit is controlled by CPU interface 201. The CPU interface 201 communicates with the cellular transceiver 212 via 204 and controls the necessary hardware on board. This initializing is started by the Watchdog Timer & Reset circuit 200 which is the circuit that jump starts the operation of all the intelligence embedded into the system, it will restart the operation of all the intelligence if it detects an improper state of the external hardware and/or internal timing sequences. During initialization, the CPU interface 201 sets all the necessary I/Os of the microprocessor to their default conditions required by the external hardware to function properly. The telephone interface 208 is preferably an FCC part 68 compatible RJ-11. At this point, if the telephonic device 108 connected to the telephone interface 208 were to be taken offhook a precision standard dial tone would be received by the telephonic device.

If a call were to be made using the telephonic device 108 the following would take place:

When telephonic device 108 connected at telephone interface 208 comes offhook, a Battery Voltage circuit 210 provides the necessary power required to operate the telephonic device 108. Since the telephonic device 108 receives power, its offhook state will be detected by an onhook & offhook detect circuit 207. It detects the Onhook/Offhook condition of the telephonic device 108. This circuit also allows the CPU interface 201 to evaluate pulse dialing activity.

Onhook offhook detect circuit 207 will report this condition of the telephonic device 108 to the CPU interface 201. Once CPU interface 201 acknowledges the offhook condition it will generate a precision dial tone and inject it to receive and transmit circuitry 206. It interfaces the receive and transmit signals from the telephonic device 108 to the receive and transmit circuitry of the cellular transceiver 212 in order to notify the telephonic device 108, that it can initiate dialing activity.

Upon reception of dial tone, digits can be dialed in two different formats:

First, DTMF (dual tone multi frequency) commonly known as touch-tone dialing, in which case the tones will be inputted to a DTMF detection circuit 202 via the receive and transmit circuit 206. The DTMF detection circuit will evaluate the digits dialed and determine their values, and relay this information to the CPU interface 201.

Second, Pulse dialing which is an older method of dialing activity, will be detected by the onhook & offhook detect circuitry 207. The digit information will then be relayed to the CPU interface 201.

The CPU interface 201 will take the digit signals received and will convert them into serial digital information that could be understood by the cellular transceiver 212. Once converted, the information will be relayed to the cellular transceiver 212 with the appropriate command which will allow the cellular transceiver 212 to access the cellular service provider through cell site 100 in order to establish a communications link with the called party.

When the called party answers the call, a communications path will be established. The data or voice information between the telephonic device and the called party will be relayed by the receive and transmit audio circuit 206.

This established link can be terminated two ways:

First, the called party can hang up. This is usually referred to as the remote hang up. In this case the cell site 100 will notify the cellular transceiver 212, and the cellular transceiver will relay the information to the CPU interface 201. Upon receiving this information the CPU interface 201 will simply set all the external circuitry as if a hang up occurred at the local telephonic device 108.

Second, the calling party hangs up. This is usually referred to as the local hang up. In this case the CPU unit 201 is informed by the onhook & offhook detection circuit 207 that the telephonic device 108 has been hung up. The CPU interface 201 will in turn relay this message by sending an appropriate "end of call" message that is valid for the particular cellular transceiver 212.

If a call were to be received by the cellular telephone interface unit the following would take place:

The cellular transceiver 212 would be notified by the cell site 100 that it is being paged by the cellular communication system. This message will be relayed to the CPU interface 201, which in turn will activate the ringer circuit 203. Once the CPU informs this circuit that there is an incoming call, the unit will ring a telephonic device 108 connected to the telephonic interface 208. This ringer signal is then injected to the telephonic device 108 via telephonic interface 208. The telephonic device 108 will ring and the user would have to take the telephonic device 108 offhook. Upon noticing that the telephonic device 108 has been taken offhook, the onhook & offhook detect circuit 207 will notify the CPU interface 201 which then will send the appropriate call answer message for the communication device in use, thereby enabling a communications link with the calling party.

A power generation circuit 209 supplies the necessary power for the cellular transceiver 212 to function. The power from the power generation circuit 209 is relayed to the cellular transceiver 212 via cellular telephone interface 204.

Figure 8:
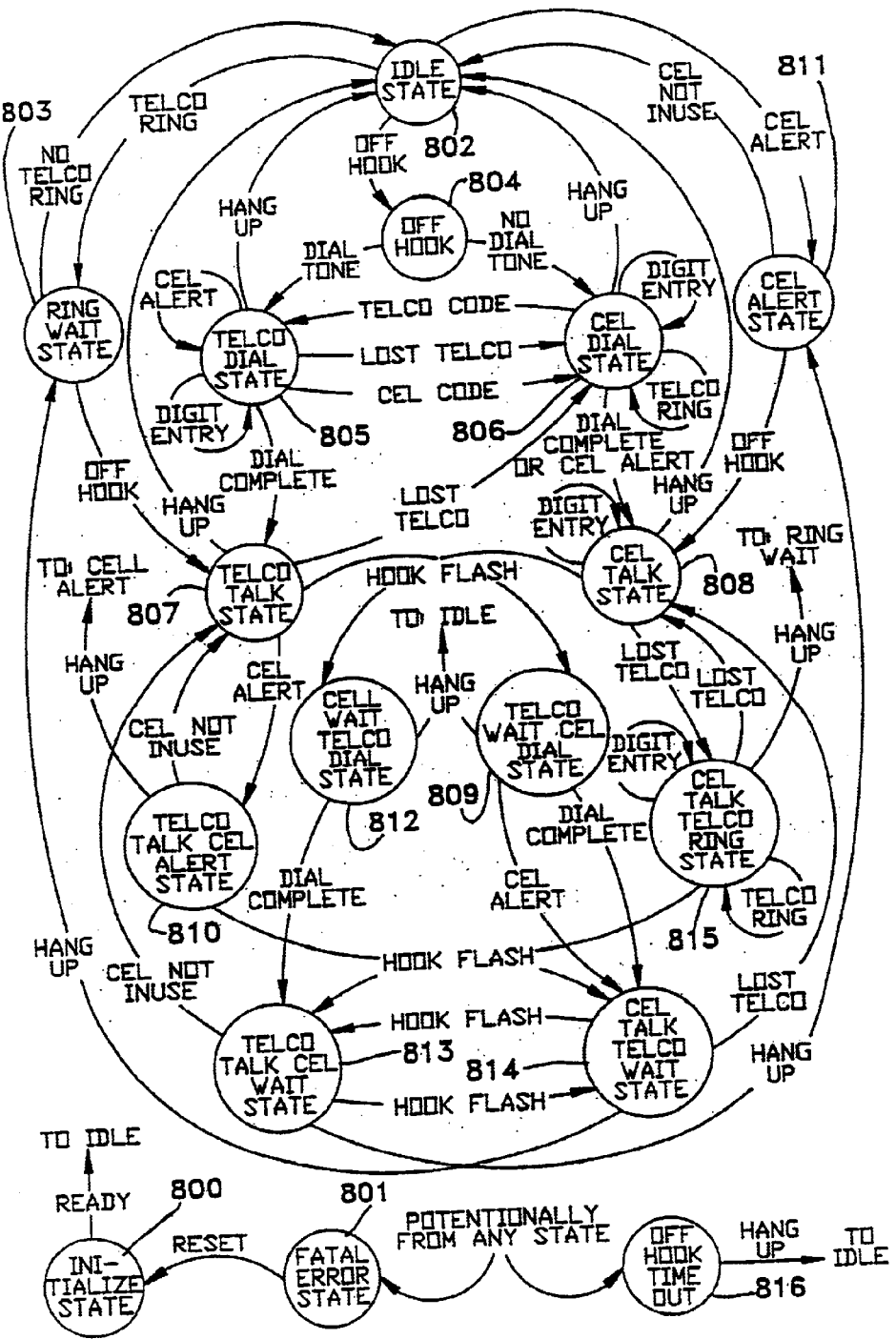
FIG. 8 is a state diagram showing the operation of the invention as controlled by software.

Referring now to FIG. 8, there is shown the state diagram of the invention. An Initialize State 800 is in effect when the system is reset or initially turned on. During the Initialize State 800, communication lines are monitored to verify that appropriate connections exist in order to support product functionality. If the connections are correct, an Idle State 802 becomes active. If the connections are not correct, or some non recoverable error occurs, then a Fatal Error State 801 becomes active.

The Idle State 802 is the main state that occurs when the system is ready and waiting for some event to occur. Events that will initiate a response while in the Idle State 802 are: the incoming Telco Ring event, the Off Hook from the POTS device event, and the incoming Cel Alert event The Telco Ring event will cause a Transition to a Ring Wait State 803. The Off Hook event will connect the telco line and cause a transition to the Off Hook State 804. The Cel Alert event will connect the cellular line and cause a transition to a Cel Alert State 811.

The Off Hook State 804 becomes active whenever the Off Hook event occurs from the Idle State 802. While in the Off Hook State 804, the system checks for the presence of a telco dial tone from the telephone company indicated by the Dial Tone event and the No Dial Tone event. If the system detects the telco dial tone, a transition is made to a Telco Dial State 805. If, however, the Dial Tone event is not detected, the system connects the cellular line, generates a cel dial tone (differentiated from the telco dial tone), and then transitions to a Cel Dial State 806.

The Telco Dial State 805 represent a condition where the system is connected to the telco line, and the telephonic device is off hook. While in this state 805, the system will monitor and respond to one of six events: The Cel Alert event, the Digit Entry event, the Dial Complete event, the Cel Code digit entry event, the Lost Telco connection event, and the Hang Up event. If the Cel Alert is detected, the system will momentarily connect the cellular line, sound a beep, and then connect back to the telco line indicating to the user that there is an incoming call on the cellular line. If the Digit Entry is detected, the digit pressed is stored by the system in a digit buffer. If the digit buffer contains the appropriate digits (such as C), or if the Lost Telco connection is detected, the system is then connected to the cellular line, the Cel Dial Tone is generated, and a transition is made to the Cel Dial State 806. If the Dial Complete event occurs, indicating that the user has finished dialing, then a transition is made into a Telco Talk State 807. The Hang Up event will simply cause a transition back to the Idle State 802. Any time a transition is made into the Telco Dial State 805 or the Cel Dial State 806, the digit buffer is cleared. The Cel Dial State 806 represent a condition where the system is connected to the cellular line, and the POTS device is off hook While in this state 806, the system will monitor and respond to one of six events: The Cel Alert event, the Digit Entry event, the digit Dial Complete event, the Telco Code digit entry event, the Telco Ring event, and the Hang Up event. If the Cel Alert or the Dial Complete is detected, the system will initiate a cellular send command and transition to a Cel Talk State 808. If the Digit Entry is detected, the digit pressed is stored by the system in the digit buffer. If the digit buffer contains the appropriate digits (such as T), the system is then connected to the telco line, and a transition is made to the Telco Dial State 805. If the Dial Complete event occurs, indicating that the user has finished dialing, then a transition is made into a Cel Talk State 808. If the Telco Ring event occurs, the system will sound a beep indicating that an incoming call has been detected on the telco line. The Hang Up event will simply cause a transition back to the Idle State 802.

The Telco Talk State 807 represents a state where a connection to another party has been established on the telco line. This may occur either through an incoming call from the Ring Wait State 803, or through an ongoing call from the Telco Dial State 805. While in the Telco Talk State 807, the system will monitor and respond to one of four events: The Hang Up event, the Lost Telco connection event, the Cel Alert Event, and the hook Flash Event. The Hang Up event will simply cause a transition back to the Idle State 802. If the Lost Telco connection is detected, the system will connect the cellular line and check to see if there is a complete entry in the digit entry buffer meaning a number had been dialed as an outgoing call. If the digit entry is complete, the entry is redialed on the cellular line and a transition is made to the Cel Dial State 806. However, if a complete entry does not exists in the buffer, then the transition is made to the Cel Dial State 806 and the cel dial tone is generated. If the Hook Flash event occurs, the telco line is put on hold by the system, the cellular line is then connected, and a transition is made to a Telco Wait Cel Dial State 809. If the Cel Alert is detected, the system will momentarily connect the cellular line, sound a beep, and then connect back to the telco Line and then cause a transition to a Telco Talk Cel Alert State 810.

The Cel Talk State 808 represents a state where a connection to another party has been established on the cellular line. This may occur either through an incoming call from the Cel Alert State 811, or through an ongoing call from the Cel Dial State 806. While in the Cel Talk State 808, the system will monitor and respond to one of four events: The Hang Up event, the Telco Ring event, the digit entry event, and the Hook Flash Event. The Hang Up event will simply cause a transition back to the Idle State 802. The Digit Entry event will be audibly produced or echoed to the user. If the Telco Ring event is detected, the system will sound a beep indicating an incoming call on the telco line and transitions to Cel Talk Telco Ring State 815. If the Hook Flash event occurs, the telco line is then connected, and a transition is made to a Cel Wait Telco Dial State 812.

The Cel Wait Telco Dial State 812 represents a state where a connection to another party has been established on the cellular line, and the user has done a hook flash to dial out on the telco line without losing the cellular party. Therefore this state 812 will respond to only one of two events: The Digit Dial Complete event for dialing another party, and the Hang Up event. The Hang Up event will simply cause a transition back to the Idle State 802. The Dial Complete event will cause a transition to a Telco Talk Cel Wait State 813.

The Telco Wait Cel Dial State 809 represents a state where a connection to another party has been established on the telco line, and the user has done a hook flash to dial out on the cellular line without losing the telco line party. Therefore this state 809 will respond to only one of three events: The Dial Complete event for dialing another party, the Cel Alert event, and the Hang Up event. The Hang Up event will simply cause a transition back to the Idle State 802. If the Dial Complete or the Cel Alert events occur, the system will initiate a send command and will cause a transition to a Cel Talk Telco Wait State 814.

The Telco Talk Cel Alert State 810 represents a state where a connection to another party has been established on the telco line, and the Cel Alert has occurred. In this state 810, the system will respond to the Hook Flash event, the Hang Up event, and the Cel not Inuse event. The Hang Up event will cause a transition to the Cel Alert State 811. The Cel not Inuse event will cause a transition back to the Telco Talk State 807. If the Hook Flash is detected, the system will put the telco line on hold, connect the cellular line, and make a transition into the Cel Talk Telco Wait State 814.

The Cel Talk Telco Ring State 815 represents a state where a connection to another party has been established on the cellular line, and the Telco Ring event has occurred. In this state 815, the system will respond to the Hook Flash event, the Hang Up event, the Digit Entry event, the Lost Telco event, and the Telco Ring event. The Hang Up event will cause a transition to the Ring Wait State 803. If the hook Flash is detected, the system connects the telco line, and makes a transition into the Telco Talk Cel Wait State 813. If the Telco Ring is detected, the system will sound a beep. If the Lost Telco connection occurs, a transition is made into the Cel Talk State 808. The Digit Entry event will cause the digit to be echoed on the telephonic device.

The Telco Talk Cel Wait State 813 represents a condition where the telco line is connected with an active party, and there is also a party waiting on the cellular line. In this Telco Talk Cel Wait state 813, the system will respond to the Hook Flash event, the Cel Not Inuse Event, and the Hang Up event. If the Hook Flash occurs, the telco line is placed on hold, the cellular line is reconnected, and a transition to the Cel Talk Telco Wait State 814 is made. If the Cel not Inuse event occurs, a transition is made to the Telco Talk State 807. If the Hang Up event occurs, the system will reconnect the cellular line, begin ringing in order to re-establish connection with the party waiting on the cellular line, and make a transition to the Cel Alert State 811.

The Cel Talk Telco Wait State 814 represents a condition where the cellular line is connected with an active party, and there is also a party holding on the telco line. In this state 814, the system will respond to the Hook Flash event, the Lost Telco Event, and the Hang Up event. If the Hook Flash occurs, the telco line connected and released from hold, and a transition to the Telco Talk Cel Wait State 813 is made. If Lost Telco connection event occurs, a transition is made to the Cel Talk State 808. If the Hang Up event occurs, the system will leave the cellular line connected, begin ringing in order to re-establish connection with the party waiting on the telco line, and make a transition to the Ring Wait State 803.

The Ring Wait State 803 represents a condition where the telephonic device is hung up and ringing due to a party on the telco line. This can occur because there is an incoming call on the telco line, or because there is a previous party waiting on the telco line after hanging up on the cellular line through the Cel Talk/Telco Wait State 814. While in this state 803, the system will respond to the No Telco Ring event by making a transition back to the Idle State 802. The system will also respond to the Off Hook event by connecting the telco line (which may or may not be connected already), and releasing a potential hold, and then making a transition to the Telco Talk State 807.

The Cel Alert State 811 represents a condition where the telephonic device is hung up and ringing due to a party on the cellular line. This can occur because there is an incoming Cel Alert, or because there is a previous party waiting on the cellular line after hanging up on the telco line through the Telco Talk Cel Wait State 813. While in this state 811, the system will respond to the Cel not Inuse event by making a transition back to the Idle State 802. The system will also respond to the Off Hook event by making a transition to the Cel Talk State 808.

The Fatal Error State 801 is state where the system has determined that a non-recoverable error condition exists. In this state 801, the system must be turned off and/or reset. This state 801 may be potentially entered from any state capable of detecting a fatal error condition.

An Off Hook Timeout State 816 can occur any time the telephonic device is left unattended and in the off hook position. If this condition occurs in certain states, this state 816 will become active. While in this state 816, the only event that is allowed is the Hang Up event which causes a transition back to the Idle State 802.

Figure 5:
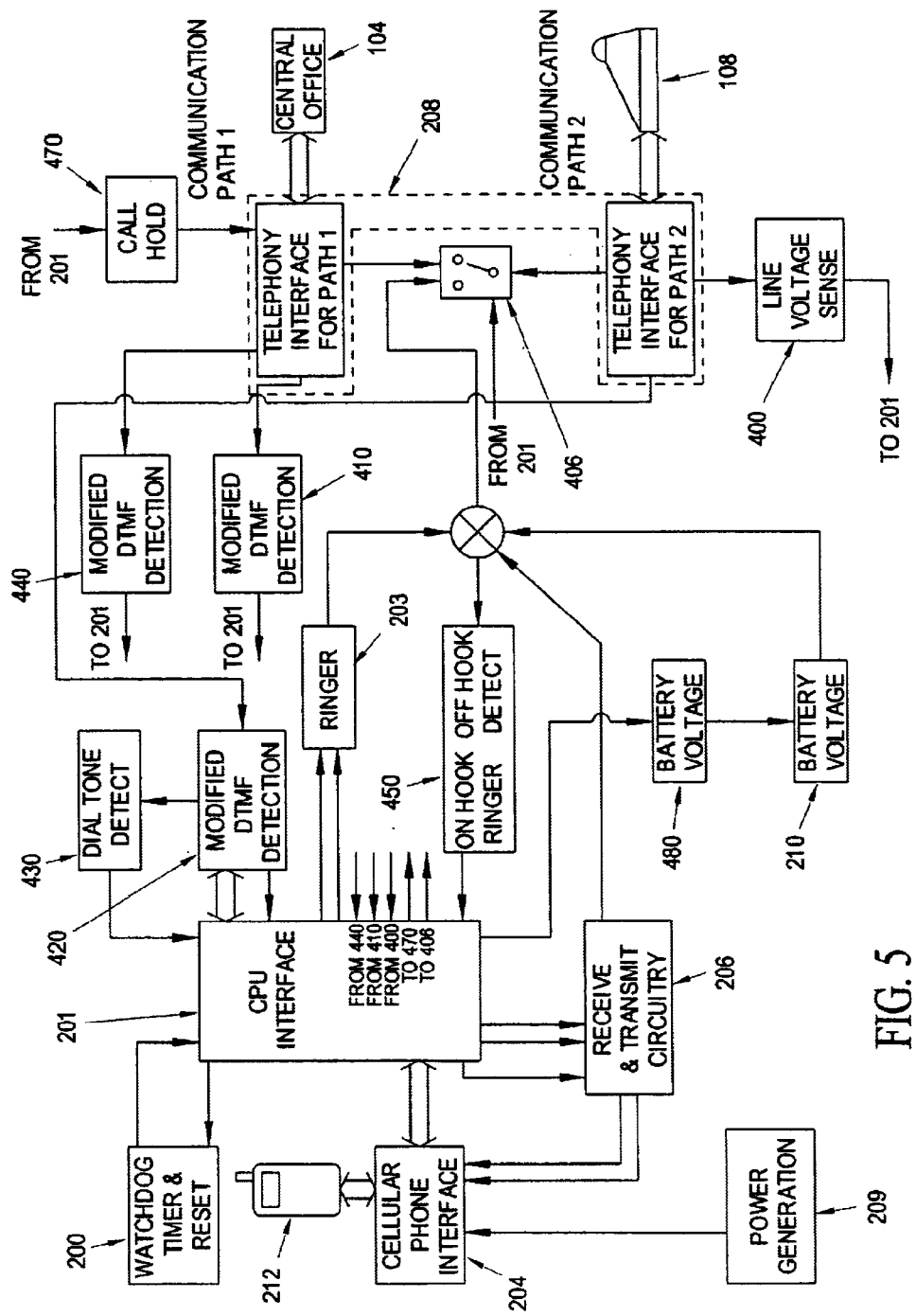
FIG. 5 is a block diagram of the invention.
Figure 6B:
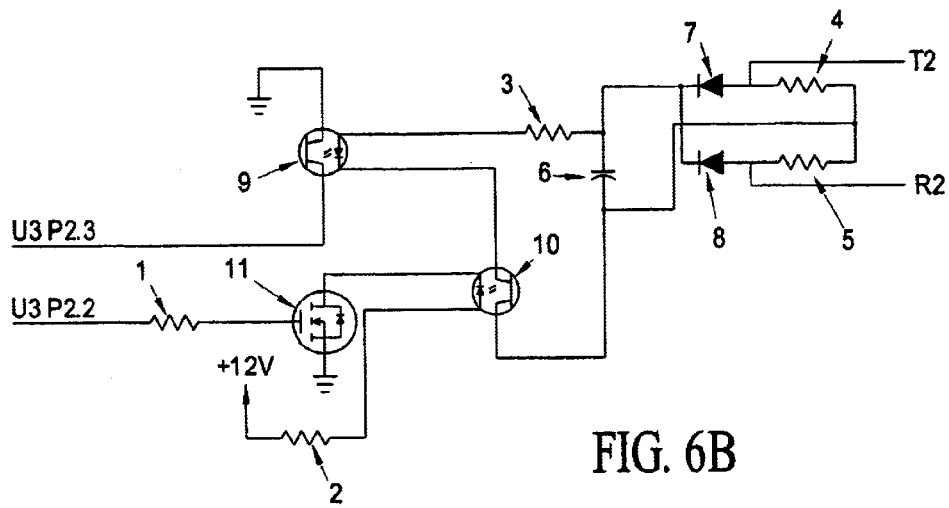
FIGS. 6B–6J are detailed schematic diagrams of portions of FIG. 6A corresponding to blocks of FIG. 5.

Referring to FIG. 5, a Voltage Detect Circuit 400 is shown in block form in FIG. 5 and shown in detail in FIG. 6B; it detects unwanted DC voltages on communication path 2 prior to connecting the interface circuit to the path. The voltage detect circuit 400 detects unwanted DC voltages by placing a capacitance across the tip and ring of communication path 2. To determine if an unwanted voltage is present, the capacitance is allowed to charge from the unwanted voltage and subsequently discharge, on command from the microprocessor U3, FIG. 6A, through a optically isolated sensing network. The sensing network develops a logic signal input to CPU 201 indicating the presence or absence of voltage. Referring now to FIG. 6B, the circuit consists of resistors 1–5, diodes 7 and 8, capacitor 6, transistor 11, and opto-isolators 9 and 10. The function is as follows:

The tip 128-C and ring 128-D of communication path 2 (FIG. 3) are connected to inputs T2 and R2 of the circuit 400 shown in block form in FIG. 5 and shown in detail in FIG. 6B. Resistors 4 and 5 form a voltage divider across the tip and ring. Capacitor 6 is connected across 4 and 5 through steering diodes 7 or 8 respectively. The conducting diode is determined by the polarity of any voltage present between the tip and ring for communication path 2. Capacitor 6 charges through the conducting steering diode to one-half the open circuit talk battery voltage. The microcontroller U3 (FIG. 6A) polls the charge state of the capacitor by generating a logic high (+5 VDC) from U3 P2.2 to transistor 11 through current limiting resistor 1. This forces transistor 11 into conduction, resulting in the flow of current from the +12 VDC supply, through current limiting resistor 2, and the LED (terminals 2&4) of opto-isolator 10. The phototransistor of opto-isolator 10 conducts due to current flow in the associated LED, allowing capacitor 6 to discharge through current limiting resistor 3 and the LED (terminals 4&2) of opto-isolator 9. Current flowing in the LED of 9 forces the associated phototransistor to conduct, placing GROUND on P2.3 input of microprocessor U3. The microcontroller software polls the state of the input to determine the presence of talk battery on communication path 2. If the pin state is logic high (+5 VDC), no talk battery is present. If the state is logic low (GROUND), talk battery is present on the path.

Figure 6C:
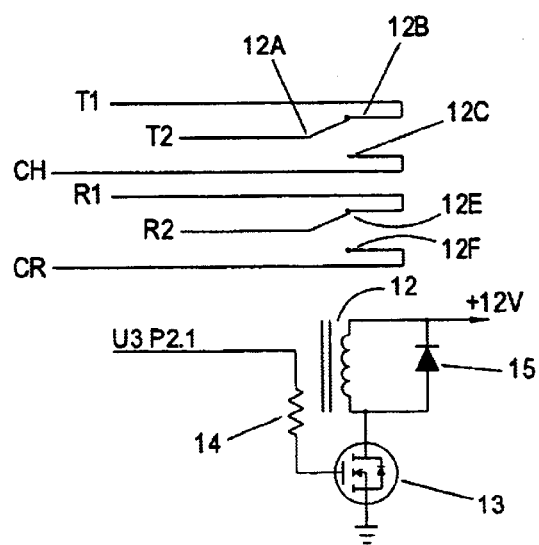

A communication path switching circuit 406, shown in block form in FIG. 5 connects a Part 68 telephonic type device to multiple communication media systems i.e., to a telephone line or to a cellular system interface of the invention. The communication path switching circuit 406, shown in detail in FIG. 6C, consists of relay 12, a transistor 13, a current limit resistor 14, and a diode 15. The Part 68 telephonic device terminals are connected to the contacts 12A–12F of relay 12. Contacts 12A–12C switch one terminal of the Part 68 device between communication path 1 and the cellular interface. Contacts 12D, 12E, & 12F switch the other terminal. Control of relay 12 is accomplished by a signal from microprocessor U3. A logic high (+5 VDC) from U3 (FIG. 6A) P2.1 is applied to transistor 13 through current limiter 14. Transistor 13 conducts upon application of the logic high, allowing current to flow through the coil of relay 12, changing the state of the relay and connecting the Part 68 device to the cellular interface. A logic low (GROUND) from U3P2.1 cuts 13 off, terminating the coil current of 12, allowing the relay to change state and connecting the Part 68 device to communication path 1.

Figure 6D:
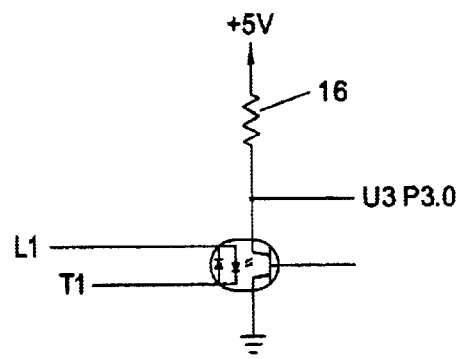

A loop current detection circuit 410, shown in block form in FIG. 5, detects the presence of loop current flowing on communication path 1. This circuit 410 shown in detail in FIG. 6D provides an electrically isolated logic signal to microprocessor U3 (FIG. 6A) indicating an on-hook or off-hook condition for the Part 68 device when connected to the central office via path 1. The loop current detection circuit 410 consists of pullup resistor 16 and opto-isolator 17. The circuit functions as follows: The loop current path between communication path 1 and the Part 68 telephonic device flows through the bi-directional LED (terminals L1 & T1) of opto-isolator 17. The presence of loop current (off-hook condition) forces the phototransistor in 17 to conduct, placing a logic low (GROUND) on input P3.0 of microcontroller U3. The absence of loop current (on-hook condition) cuts off the phototransistor of 17, placing a logic high (+5 VDC) via 16 on U3 P3.0.

Figure 6E:
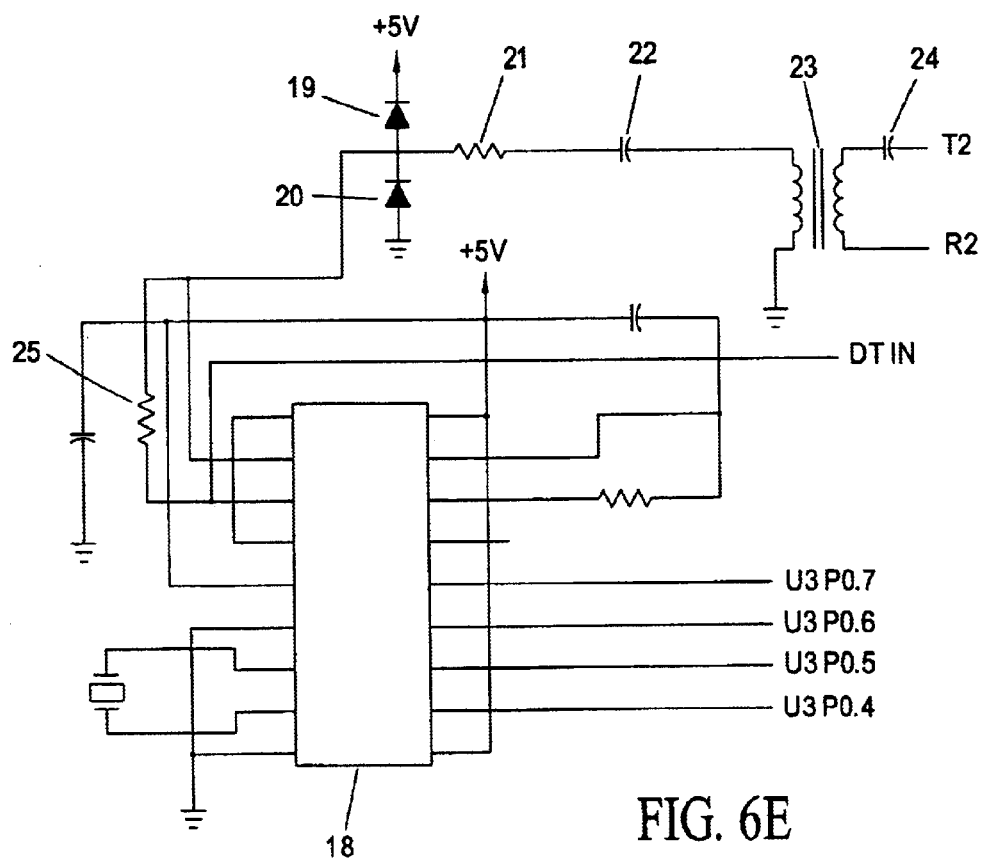

A DTMF (Dual Tone Multi Frequency) detection circuit 420, shown in block form in FIG. 5, couples DTMF from communication path 2 (either by loop voltage or loop current variations) for processing by microprocessor U3. The components of the DTMF Detection Circuit 420, shown in detail in FIG. 6E, consists of a DTMF decoder 18, clamp diodes 19 and 20, limiting resistors 21 and 25, DC blocking capacitors 22 and 24, and transformer 23. Transformer 23 is a 1:1 isolation transformer with 600 ohm primary and secondary impedances. The primary of 23 is connected across the tip and ring (T2 & R2) of communication path 2 through capacitor 24. DTMF energy present on communication path 2 is coupled through 24 to transformer 23 primary and across 23 to the secondary. From transformer 23 secondary the isolated DTMF energy is routed to the DTMF decoder 18 via resistor 25 for processing.

Figure 6F:
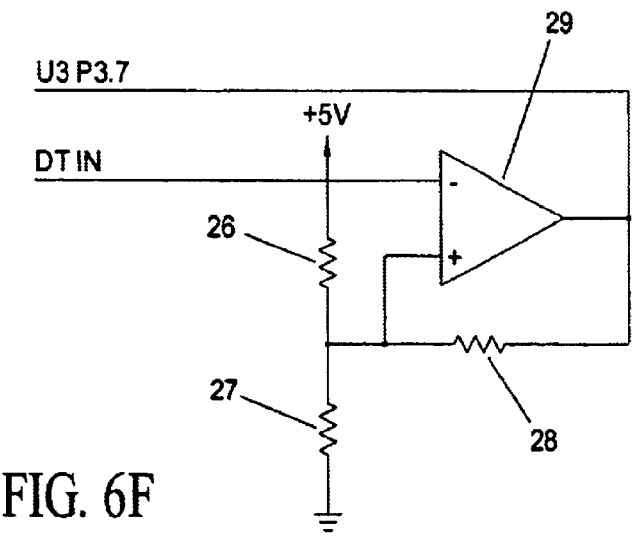

A dial tone detection circuit 430, shown in block form in FIG. 5, provides an electrically isolated signal to the microprocessor U3 (FIG.6A) for the purpose of determining the presence of a dial tone signal. As shown in detail in FIG. 6F, the circuit 430 consists of resistors 26–28, and a comparator 29. A sample of the audio signal on communication path is conveyed to the inverting input of comparator 29 (pin 6) from 18, previously discussed. When the audio signal at comparator 29 pin 6 exceeds the threshold established by voltage divider resistors 26 and 27 at comparator 29 pin 5, the output of 29 (pin 7) changes state from a logic high (+5 VDC) to a logic low (GROUND). In the case of dial tone audio, the logic signal takes on the form of a periodic pulse train. These logic state changes are conveyed to U3 input P3.7 for processing by the microprocessor software.

Figure 6G:
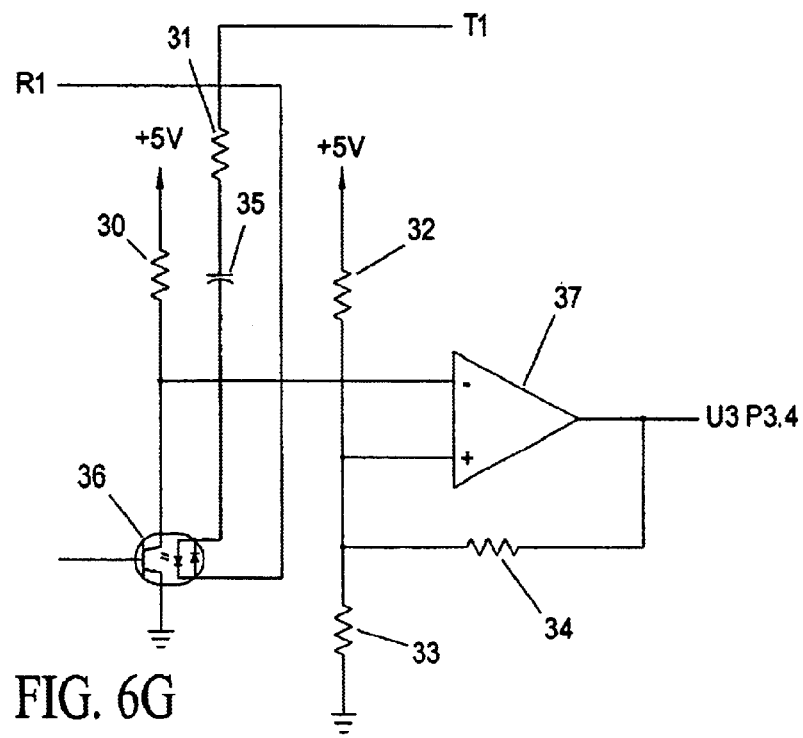

A ring signal detection circuit 440, shown in block form in FIG. 5, detects the presence of a ring signal voltage or current on communication path 1, originating in the central office, and it provides an isolated logic level to the microcontroller indicating the occurrence of a ringing event. As shown in detail in FIG. 6G, the components of the Ring Signal Detection Circuit 440 consists of resistors 30–34, a capacitor 35, an opto-isolator 36, and comparator 37. The circuit functions as follows: The Central Office ringing signal is coupled from communication path 1 via R1 through current limiting resistor 31, DC blocking capacitor 35, the bi-directional LED (terminals 1&2) of 36, and returning via T1. Application of the ringing signal to 36 causes the LED to illuminate forcing the associated phototransistor to conduct. The conducting phototransistor places a ground at the inverting input of comparator 37 pin 9 forcing the output of 37 pin 8 to a logic high (+5 VDC). The termination of the central office ringing signal cuts off the LED illumination of 36, forcing the phototransistor into a non-conducting state, and placing +5 VDC on pin 9 of 37 via pull-up resistor 30. This condition results in a logic low (GROUND) output from pin 8 of 37. The logic states indicating the presence/absence of ringing signals are conveyed to microprocessor U3 input P3.4 (FIG. 6A) for processing by the microprocessor software.

Figure 6H:
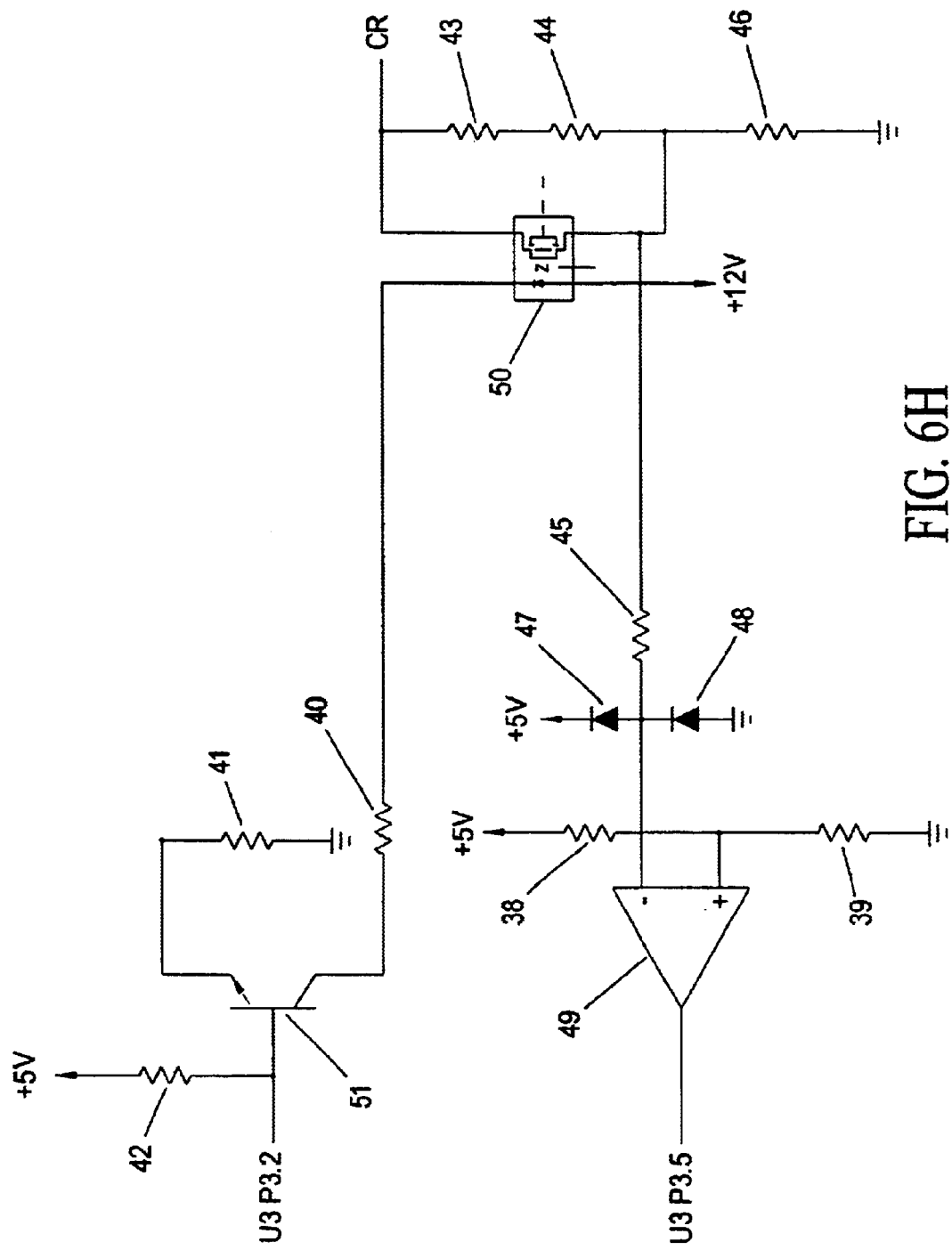

A ringer detection circuit 450, shown in block form in FIG. 5, tests to determine if a Part 68 telephonic device has been connected to communication path 2. Testing is accomplished by placing a test ringing signal on the path and observing the presence of current flow in the path due to the signal and a connected Part 68 device. The presence or absence of the Part 68 device is transmitted to the microcontroller as a logic signal. As shown in detail in FIG. 6H, the ringer detection circuit 450 consists of resistors 38–46, clamp diodes 47 and 48, a comparator 49, a solid state relay 50 and a transistor 51. The circuit functions as follows: A test ringing signal is generated by block 203, described previously, and applied to the communication path 2. If an on-hook, Part 68 telephonic device is connected to the path, the ringing signal forces current to flow through resistor 46, solid state relay 50, to the connected Part 68 device and the ringer signal generator 203 via CR. Solid state relay 50 is closed and shunts 43 & 44 due to a U3 P3.2 microcontroller signal applied through 40, 41 and 51. A voltage develops across 46 due to the ringer current flow and is applied to the inverting input (pin 2) of comparator 49 via resistor 45 and clamp diodes 47 & 48. The application of voltage to 49 forces the device output at pin 1 to a logic low state (GROUND). The output of comparator 49 pin 1 is input to the microprocessor U3 at input P3.5 (FIG. 6A) for processing. Removal of the ringing signal, or the lack of an on-hook Part 68 device connected to the path, forces 49 to a logic high state (+5 VDC).

Figure 6I:
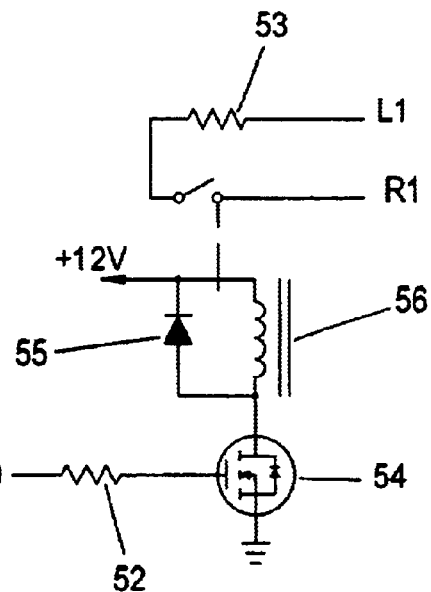

A call hold circuit 470, shown in block form in FIG. 5, continues loop current flow through the normal communication path 1 while the Part 68 telephonic type device is disconnected from the normal communication path 1 and connected to cellular interface. As shown in detail in FIG. 6I, the call hold circuit consists of resistors 52 and 53, a transistor 54, a diode 55, and a relay 56. Microprocessor U3 (FIG. 6A) generates a logic high (+5 VDC) at P2.0. This signal is applied to transistor 54, via current limiting resistor 52, forcing 54 to conduct. Conducting transistor 54 causes current to flow through the armature coil of relay 56, closing the associated contacts. The contact closure forces loop current from communication path 1 to flow through terminating resistor 53 via L1 & R1. With communication path 1 terminated in this manner, the Part 68 telephonic device may be connected to cellular interface without terminating a call in progress on communication path 1. A logic low (GROUND) at U3 P2.0 terminates the relay 56 closure condition.

Figure 6J:
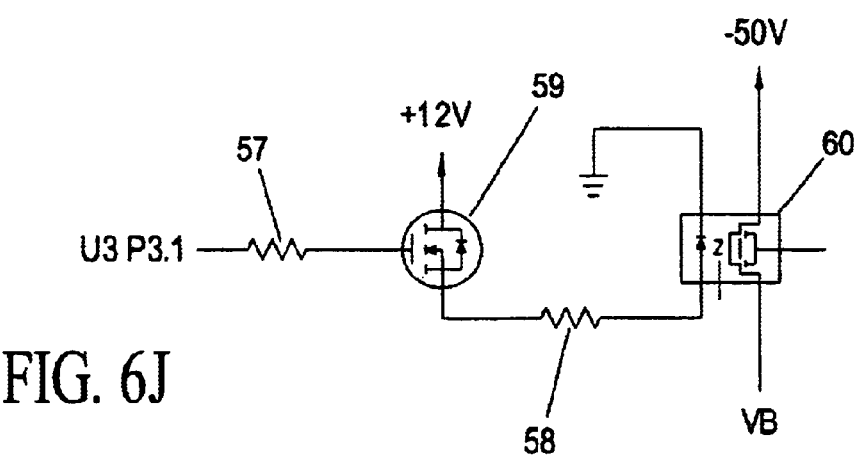

A battery control voltage circuit 480, shown in block form in FIG. 5, enables or disables the generation of voltages supplied to the Part 68 telephonic type device loop circuit. As shown in detail in FIG. 6J, the battery control voltage circuit consists of resistors 57 and 58, a transistor 59, and a solid state relay 60. The circuit enables or disables cellular interface talk battery generation as follows: A logic signal from microprocessor U3 P3.1 controls the operation of the circuit. The logic signal is applied to transistor 59 via current limit resistor 57. A logic high (+5 VDC) turns 59 on, closing solid state relay 60 at terminals 4 & 6. The relay closure allows the application of −50 VDC, generated by previously described block 210 at VB, to the Part 68 device. A logic low at U3 P3.1 opens relay 60 terminals 4 & 6, terminating the battery voltage connection.

Figure 7:
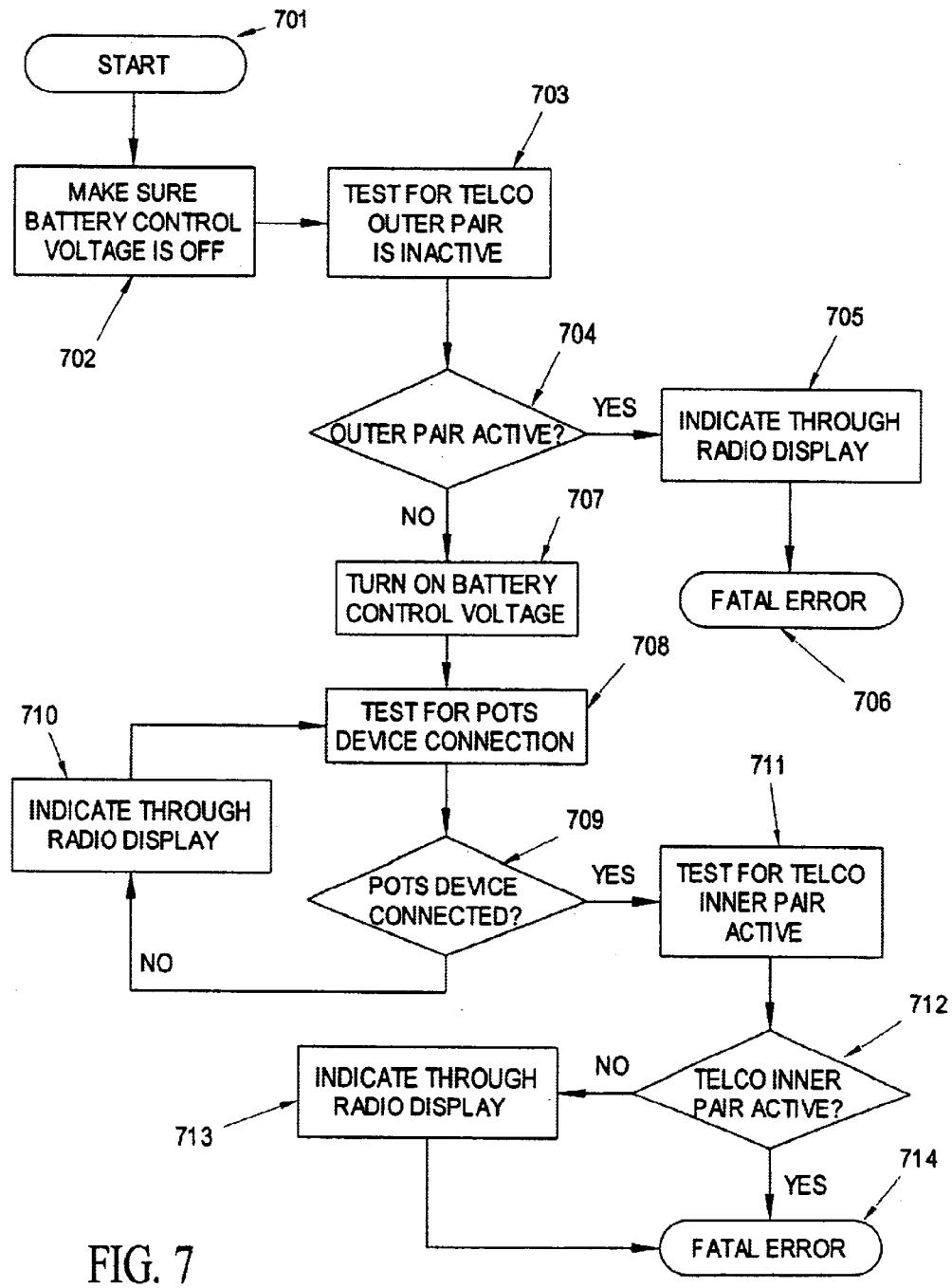
FIG. 7 is a flow chart showing the operation of the invention including the testing of the wireline telephone company's lines during initialization

The system control flow from a power on condition to a normal running condition is depicted by FIG. 7. A Start condition 701 is shown indicating the start of control flow from the power on condition. First, software guarantees that the talk battery control voltage is turned off (even though this is the default hardware state) by writing an active low to U3, port P3.1 (FIG. 6A) indicated by process block 702.

After the talk battery control voltage is turned off, the software flow proceeds to process block 703, to test the outer telco pair. The outer telco pair is determined to be active if an active high is detected by software on U3, port P2.3, after software holds U3, port P2.2 (FIG. 6A) high. Software does not hold U3, port P2.2 high before pulsing it three times, and then holding it low, in order to discharge any potential floating capacitance on the line. Software then proceeds to check if the outer pair is active indicated by decision block 704. A process block 705 is executed if the outer telco pair is active in order to display an error message through the radio, at which time, the software proceeds to the Fatal Error state 706. While in the Fatal Error state 706, the system must be re-powered. If, however, the outer telco pair is detected as being inactive, then the talk battery voltage is turned on indicated by process block 707. Then software proceeds to process block 708.

The process block, item 708 indicates a software test to ensure that at least one standard telephonic type communication device is correctly connected. This is done through software by applying an active high to U3, port P3.2 (FIG. 6A) to turn on ring voltage, then applying a 20 Hz signal to U3, port P1.5 and detecting a 20 Hz signal at U3, port P3.5. After software does this check, the ring voltage is turned off (active low on U3, port P3.2). If the 20 Hz signal is detected, then it is assumed that at least one standard telephonic type communication device is correctly connected. Then software proceeds through a decision block, item 709, to process block 711. If however, there is no standard telephonic type communication device signal seen, then software indicates this through the radio display 710, and loops back to the process block 708 until at least one standard telephonic type communication device is correctly connected.

When it is determined that the outer telco pair is inactive and at least one standard telephonic type communications device is correctly connected, software proceeds to the process block 711 to test that the inner telco pair is active. Software recognizes a telco inner pair connection by asserting an active high on the hardware telco hold line through U3, port P2.0 and checking that telco loop current is present (active low on input U3, port P3.0). If telco loop current is not present (through decision block 712), then an error message is displayed through the display of the cellular telephone indicated by process block 713. Then, the software proceeds directly to an idle state 714.

While a detailed description of the preferred embodiment of the invention has been given above, it should be appreciated that many variations can be made thereto without departing from the spirit and scope of the invention as set forth in the appended claims. This invention is not limited for use in buildings have a four conductor internal telephone cable. The invention can be used in buildings having any greater number of conductors in its internal telephone cable, as long as one pair of conductors (or one internal communication channel) is not in use or can be freed from use. Furthermore, the disclosure assumes the internal telephone cable of the building is comprised of discrete metallic conductors, with a pair of conductors forming a communication path; however, it is foreseen that the internal telephone cable of the building can be coaxial, fiber optic, wireless or any other form of communication path. In addition, there is no requirement in this disclosure that there be a one-to-one correspondence between internal building telephone communication channels and conductors of a cable. It is foreseen that the invention also works with any type multiplexing of telephone channels on a single communication path.

What is claimed is:

1. In a radio interface apparatus for coupling at least one land-line or land-line-type telephone instrument to a radio transceiver in order to allow said at least one land-line or land-line-type telephone instrument to make at least one of an incoming call and an outgoing call over a radio system, and connecting means connecting said at least one land-line or land-line-type telephone instrument to said radio interface apparatus, wherein the improvement comprises:

said connecting means comprising land-line telephone wiring of a land-line telephone network;

said land-line telephone wiring of a land-line telephone network being located at a premises, and comprising a tip line and a ring line, and at least two pairs of tip-and-ring terminals connected to said tip and ring lines, said radio interface apparatus being connected to one said pair of tip and ring terminals, and said at least one land-line or land-line-type telephone instrument being connected to another said pair of tip and ring terminal.

2. The improvement according to claim 1, comprising a plurality of land-line or land-line-type telephone instruments, each said telephone instrument being coupled to said radio interface by means of said land-line telephone wiring of a land-line telephone network, each said land-line or land-line-type telephone instrument being connected to a said pair of tip and ring terminals.

3. The improvement according to claim 1, wherein each said pair of tip and ring terminals comprises an RJ-11 jack of said land-line telephone wiring by which said at least one telephone instrument is connected to said telephone wiring, and, therefore, to said radio interface.

4. The improvement according to claim 2, wherein each said pair of tip and ring terminals comprises an RJ-11 jack of said land-line telephone wiring by which said plurality of telephone instruments are connected to said telephone wiring, and, therefore, to said radio interface.

5. The improvement according to claim 4, wherein said radio interface apparatus is connected to one of said plurality of RJ-11 jacks, whereby said radio interface apparatus is connected to said telephone wiring, and, therefore, to said plurality of telephone instruments.

6. The improvement according to claim 1, wherein said premises telephone wiring comprises a first separate telephone land-line capable of connection to the central office of said land-line telephone network, and a second separate telephone land-line capable of connection to the central office of said land-line telephone network; said at least one telephone instrument and said radio interface apparatus being connected to one of said first and second separate telephone land-lines.

7. The improvement according to claim 6, wherein said one separate telephone land-line, to which are connected said at least one telephone instrument and said radio interface apparatus, is free and not connected to said central office of said land-line telephone network.

8. An apparatus for coupling a radio interface apparatus to at least one land-line or land-line-type telephone instrument to a radio transceiver in order to allow said at least one land-line or land-line-type telephone instrument to make at least one of an incoming call and an outgoing call over a radio telephone system, comprising:

a radio transceiver capable of being connected to a radio telephone system for at least making or receiving a radio telephone call;

a radio interface means for connection to said radio transceiver;

at least one land-line or land-line-type telephone instrument means connected to said radio interface means for allowing said at least one telephone instrument means to make calls over a radio system via said radio transceiver; and connection means for connecting said at least one land-line or land-line-type telephone instrument to said radio interface apparatus, said connection means comprising land-line telephone wiring of a land-line telephone network;

said land-line telephone wiring of a land-line telephone network being located at a premises, and comprising a tip line and a ring line, and at least two pairs of tip-and-ring terminals connected to said tip and ring lines, said radio interface apparatus being connected to one said pair of tip and ring terminals, and said at least one land-line or land-line-type telephone instrument being connected to another said pair of tip and ring terminals.

9. The improvement according to claim 8, comprising a plurality of land-line or land-line-type telephone instruments, each said telephone instrument being coupled to said radio interface by means of said land-line telephone wiring of a land-line telephone network, each said land-line or land-line-type telephone instrument being connected to a said pair of tip and ring terminals.

10. The improvement according to claim 8, wherein each said pair of tip and ring terminals comprises an RJ-11 jack of said land-line telephone wiring by which said at least one telephone instrument is connected to said telephone wiring, and, therefore, to said radio interface.

11. The improvement according to claim 9, wherein each said pair of tip and ring terminals comprises an RJ-11 jack of said land-line telephone wiring by which said plurality of telephone instruments are connected to said telephone wiring, and, therefore, to said radio interface.

12. The improvement according to claim 11, wherein said radio interface apparatus is connected to one of said plurality of RJ-11 jacks, whereby said radio interface apparatus is connected to said telephone wiring, and, therefore, to said plurality of telephone instruments.

13. The improvement according to claim 8, wherein said premises telephone wiring comprises a first separate telephone land-line capable of connection to the central office of said land-line telephone network, and a second separate telephone land-line capable of connection to the central office of said land-line telephone network; said at least one telephone instrument and said radio interface apparatus being connected to one of said first and second separate telephone land-lines.

14. The improvement according to claim 13, wherein said one separate telephone land-line, to which are connected said at least one telephone instrument and said radio interface apparatus, is free and not connected to said central office of said land-line telephone network.

* * * * *